United States Patent [19]

Jain et al.

[11] Patent Number: 5,615,167

[45] Date of Patent: Mar. 25, 1997

[54] METHOD FOR INCREASING SYSTEM BANDWIDTH THROUGH AN ON-CHIP ADDRESS LOCK REGISTER

[75] Inventors: Anil K. Jain, Stow; John H. Edmondson, Cambridge; Peter J. Bannon, Concord, all of Mass.

[73] Assignee: Digital Equipment Corporation, Maynard, Mass.

[21] Appl. No.: 525,106

[22] Filed: Sep. 8, 1995

[51] Int. Cl.⁶ ................................................. G11C 13/00
[52] U.S. Cl. ................................ 365/230.08; 365/230.01; 365/189.05
[58] Field of Search ..................... 365/189.01, 230.01, 365/189.05, 230.03, 200, 230.08

[56] References Cited

U.S. PATENT DOCUMENTS

5,270,975  12/1993  McAdams .......................... 365/230.08
5,426,744  6/1995   Sawase et al. ...................... 395/375

*Primary Examiner*—Terrell W. Fears
*Attorney, Agent, or Firm*—Lindsay G. McGuinness; Denis G. Maloney; Arthur W. Fisher

[57] ABSTRACT

A computer system comprising one or more processor modules. Each processor module comprising a central processing unit comprising a storage element disposed in the central processing unit dedicated for storing a semaphore address lock value and a semaphore lock flag value, a cache memory system for storing data and instruction values used by the central processing unit, a system bus interface for communicating with other processor modules over a system bus, a memory system implemented as a common system resource available to the processor modules for storing data and instructions, an IO system implemented as a common system resource available to the plurality of processor modules for each to communicate with data input devices and data output devices, and a system bus connecting the processor module to the memory system and to the IO system.

12 Claims, 6 Drawing Sheets

METHOD FOR INCREASING SYSTEM BANDWIDTH THROUGH AN ON-CHIP ADDRESS LOCK REGISTER

BACKGROUND OF THE INVENTION

This invention relates generally to computer systems and more specifically to multiprocessor computer systems.

As it is known in the art a computer system typically includes a microprocessor (CPU), a main memory system, a cache system, and an I/O system, generally interconnected by system address and data busses.

A multiprocessor system is one in which more than one CPU is used to increase overall system performance. Each CPU is given enough local resources to operate independently from the larger system. These resources are sufficient for operation of the CPU but generally do not include I/O device controllers, main memory, and other resources that are shared between all CPUs. For example, a CPU typically spends a small percentage of time reading data from the floppy drive. The floppy controller can therefore be shared between many CPUs allowing one to use the device while others are not. This makes the device productive during periods when it would have otherwise been unused if dedicated to a single CPU system, and increases the amount of usable work that the controller performs.

Multiprocessor implementations greatly improve system performance because each CPU can work on different portions of a single problem. One CPU can be reading data from an I/O port, manipulating it as required, and outputting it to main memory while a second CPU reads the data from main memory for performing its portion of the problem. In this manner, overall system performance increases because the processing rate is increased.

The sharing of system resources between a plurality of central processing units leads to a problem when more than one CPU attempts to change data resident in a single shared location. In a typical problem case, a first CPU attempting to do a read-modify-write operation reads the shared location, modifies the data and attempts to write it back to the same location. Just before issuing the write instruction a second CPU also begins to perform a read-modify-write operation to the same location by reading the data. If the first CPU successfully writes the data into the shared location, the data that the second CPU is working with is no longer current. If, after manipulating the data, the second CPU writes the data back to memory, that memory location now stores the results of the second CPU's operations and not the first. This could be viewed as corrupting the common location which could lead to catastrophic failure in the computer system.

Prior art systems have implemented a solution to this problem through the use of a semaphore. A semaphore is a software mechanism or construct. In this approach a semaphore is obtained by a CPU performing a read-modify-write operation by first reading the location in memory where the semaphore is stored. The CPU concurrently sets a flag (i.e., semaphore lock flag) in a semaphore address lock register and stores the address being modified. This address lock register and lock flag are a CPU resource used to indicate that an operation on the semaphore is in progress.

This approach does not hamper other CPUs from reading the semaphore location, however each device that attempts to write the location is required to verify that the lock flag has remained set before the write can be successful. If set, that device is allowed to write the location and clear its lock flag. Other CPUs in the system monitor the bus and clear their lock flags set for that address when the write executes. When, upon an attempted write, a CPU finds that its flag has been cleared it is required to repeat the whole operation until it is permitted to write the data successfully.

The problem with this solution is that since the address lock register is implemented as a resource in the logic which interfaces the CPU to the system bus, additional processor overhead time is incurred. In such an architecture, each time a CPU needs to write a location in shared main memory using a semaphore, the CPU signals the system interface logic before gaining access to the register. It also has to wait for this interface logic to send pending cache coherency transactions. Therefore the CPU must wait for an acknowledgment to be sent back from the register indicating that the semaphore flag was successfully set. Because of the lengthy overhead time involved in interacting with the system bus interface logic and the time it takes to return the acknowledgment, a significant amount of time during each transaction is wasted. Further, once the semaphore lock flag is set, the conditional write operation executes at the relatively slow clock speed of the system bus.

In prior art systems, bus writes were not forwarded to the CPU unless they would change the status of the cache memory system. Because of this, the semaphore address lock and lock flag register had to be disposed in the system bus interface so that the lock flag would be properly cleared when a write executed for the location whose address was stored in the address lock register. Otherwise writes which were not forwarded to the CPU could cause the lock flag to improperly remain set.

SUMMARY OF THE INVENTION

In accordance with the present invention, a central processing unit which includes a storage element in the central processing unit dedicated for storing a semaphore address lock value and a semaphore lock flag value. With such an arrangement the time which it takes for the CPU to access the semaphore address lock value and a semaphore lock flag is decreased because the flag and address lock are in the CPU and the values can be accessed at the operating frequency of the CPU as opposed to the slower speed of the system bus.

In accordance with a further aspect of the present invention, a multiprocessor computer system includes a plurality of processor modules, each including a central processing unit. Each central processing unit includes a storage element dedicated for storing a semaphore address lock value and a semaphore lock flag value, as well as a cache memory system and cache control logic. Each of said plurality of processor modules further includes a system bus interface which comprises second address lock and flag values. The multiprocessor system further includes a memory system, and an IO system which are interconnected by a system bus. The system bus also interconnects the plurality of central processing modules to the memory system and to the IO system. With such an arrangement, the time it takes the central processing unit to load the semaphore address lock value and the semaphore lock flag value is decreased because they can be accessed at the operating frequency of the CPU, as opposed to the slower speed of the system bus. Furthermore, since the semaphore address lock value and the semaphore lock flag are within the central processing unit and are not implemented as a resource in the system interface logic, the processor module does not need to communicate with the system interface logic before gaining access to the semaphore location.

Since the system bus interface monitors reads and writes to memory locations in the system, the second lock flag will be cleared on all writes to the semaphore that are sent on the bus. Therefore, when an operation occurs which causes the central processing unit's lock flag value not to be updated, the interface lock flag value is logically "anded" with it. This allows the integrity of the lock flag value implemented on the CPU to be maintained.

In accordance with a further aspect of the present invention, a method for increasing the performance of a computer system includes the step of storing a semaphore address lock value and a semaphore lock flag value in a storage element in the central processing unit of the computer system. Such a method increases the performance of the system by allowing a semaphore address lock value and a semaphore lock flag value to be stored at the operating frequency of the CPU as opposed to the slower speed of the system bus interface logic.

BRIEF DESCRIPTION OF THE DRAWINGS

The foregoing features of this invention, as well as the invention itself, may be more fully understood from the following detailed description when read in conjunction with the accompanying drawings, in which.

DESCRIPTION OF THE PREFERRED EMBODIMENT

Figure 1:
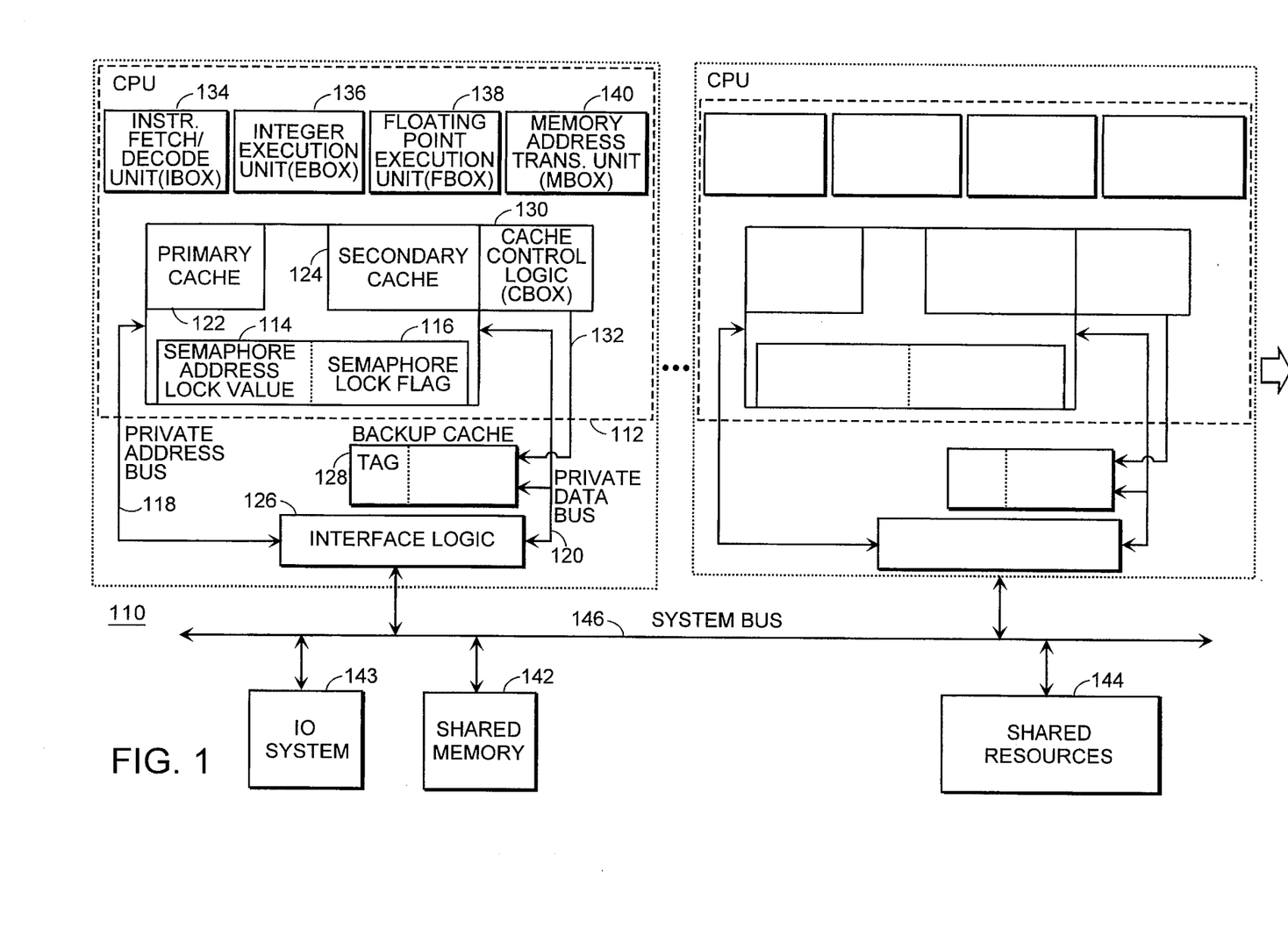
FIG. 1 is a block diagram depicting a multiprocessor system having storage elements for implementing a semaphore.

Referring to FIG. 1, a multiprocessor computer system 110 is shown to include a plurality of processor modules each including a central processing unit (CPU) 112 having a storage element for storing a semaphore address lock value 114 and a semaphore lock flag 116. A private address bus 118 and a private data bus 120 within each CPU connects a primary cache 122, a secondary cache 124, and a system bus interface 126. The private data bus 120 connects a separate backup cache 128 for each CPU. Each CPU 112 includes cache control logic 130 which is connected to the secondary cache 124 and the associated backup cache 128 by a private cache bus 132.

Each central processing unit further includes several groups of logic which enable the CPU to perform the major operations that the system requires. The Ibox 134, or Instruction Fetch and Decode Unit, controls instruction prefetching, instruction decoding, branch prediction, instruction issuance, and interrupt handling. The Ebox 136, or Integer Execution Unit, handles the functions of addition, shifting, byte manipulation, logic operations, and multiplication for integer values stored in the system. These same operations, for floating point values, are controlled by the Fbox 138, or Floating Point Execution Unit. The Mbox 140, or Memory Address Translation Unit, translates virtual addresses, generated by programs running on the system, into physical addresses which are used to access locations in the computer system. Lastly, the Cbox 130, or Cache Control and Bus Interface Unit, controls the secondary cache (Scache) and the backup cache (Bcache). It also controls the private data bus, private address bus, memory related external interface functions, and all accesses initiated by the Mbox.

For accessing main memory 142, the IO system 143, and other shared resources 144, the system bus interface 126 connects its associated CPU's private address 118 and data 120 busses to the system bus 146. In this configuration, the interface logic 126 also monitors the system bus 138 and sends an invalidate command to its associated CPU 112 whenever a write operation occurs in main memory 142. This allows the CPU to maintain cache coherency as well as update the current status of its semaphore lock flag 116.

When a CPU 112 in the multiprocessor computer system 110 attempts to modify a location in memory 142, it does so under the control of a semaphore construct which is also stored in memory. An example of instructions that are used to access a semaphore are a Load-Locked instruction and a Store-Conditional instruction. An example of a source code listing which uses the semaphore address lock and semaphore flag values to perform a read-modify-write operation on a semaphore location is shown below:

| START: | Ld_L | R0, ADDR1; |
|---|---|---|
| | . | . |
| | . | . |
| | . | . |
| | St_C | R1, ADDR1; |
| | BEQ | R1, START; |

In order to perform a read-modify-write to the semaphore at address ADDR1, the program executes a Ld_L (Load-Locked) instruction. This loads the value, stored at address ADDR1 in main memory, into R0 and sets the semaphore lock flag (flag=logic 1) 116. The program then modifies the data in whichever manner is required. To complete the semaphore operation, a St_C (Store-Conditional) instruction is executed which examines the semaphore lock flag 116 before writing the data back into memory 142. If the semaphore lock flag 116 has remained set, the write completes and register R1 is loaded with the value 1 to indicate that the operation completed successfully. If the lock flag 116 has been cleared, indicating that another CPU has written the semaphore location, the write will not complete. A logic 0 will be loaded into register R1 to show that the operation failed. The BEQ (branch if equal to zero) instruction branches to the top of the code section and the sequence of operations is restarted. This will continue until the data is successfully written to address ADDR1, at which point control is transferred to the next program instruction.

Figure 2:
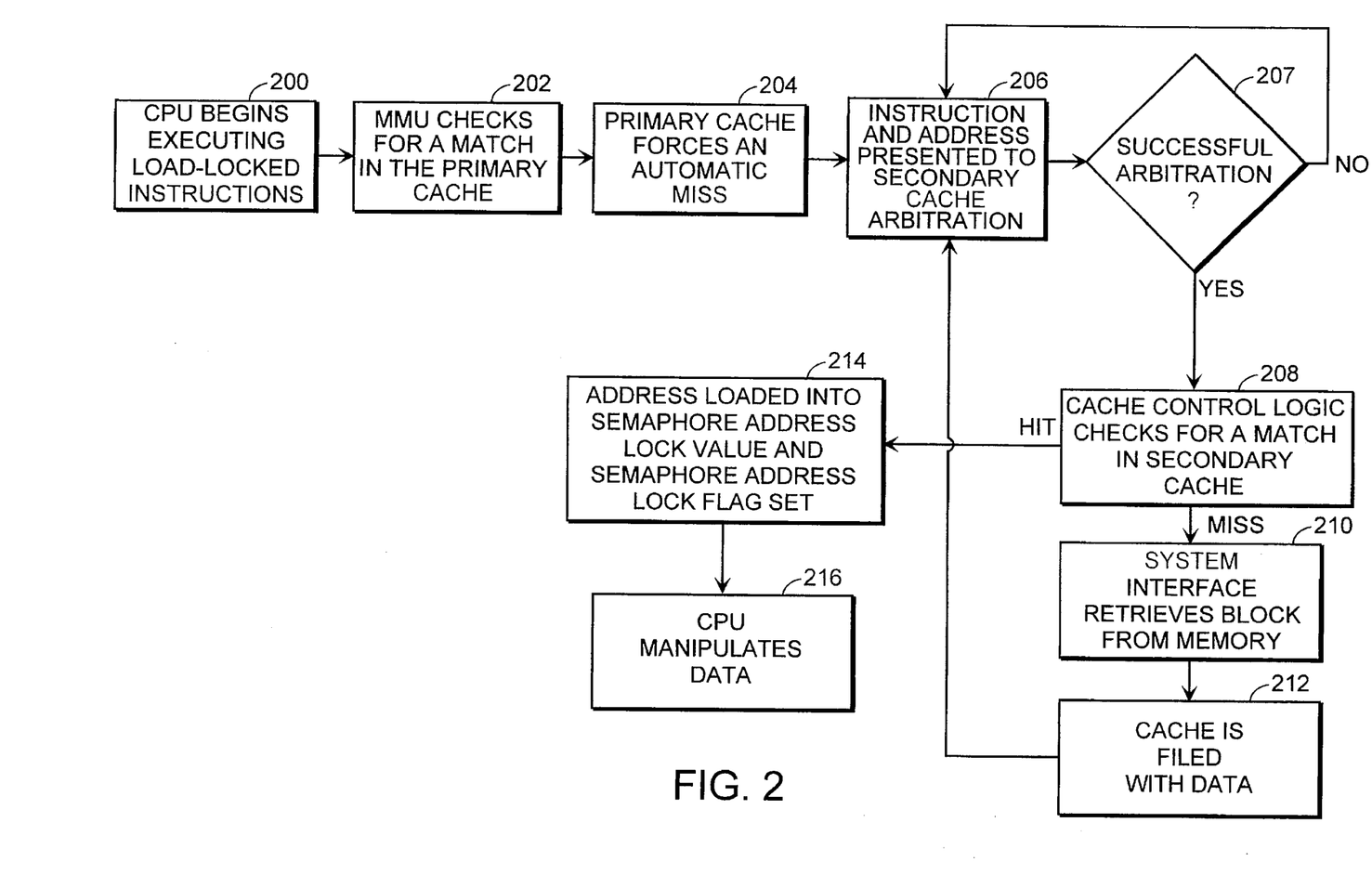
FIG. 2 is a flow chart diagram depicting the steps which the multiprocessor system of FIG. 1 performs when executing a Load-Locked instruction.

Referring now to FIG. 2, the operation of the multiprocessor system of FIG. 1 in response to a Load-Locked instruction is shown. A semaphore operation is initiated when the CPU begins executing a Load-Locked command (step 200). Execution of the instruction causes the CPU's Memory Management Unit (MMU) to check if any tag in the primary cache system matches the requested address (step 202). When the control logic for the primary cache determines that the intent of the instruction is to lock the address, it forces an automatic miss (step 204). This occurs even if the primary cache contained a matching entry because only the control logic for the lower level cache has access to the address lock register and lock flag.

Generation of a primary cache miss passes control of the instruction to the Cbox 130 which controls the secondary and backup cache systems. The Cbox presents the command and address to the secondary cache's arbitration unit (step 206) which employs an algorithm for determining which of several groups of control logic has access to the secondary cache.

After winning arbitration (step 207) the command and address are checked against the cache entries for a match (step 208). If a miss occurs the secondary cache sends an instruction to the interface logic to retrieve the block from memory (step 210) containing the requested address. When the cache is filled (step 212) the command and address are again presented (step 208) and a hit occurs. The Cbox then loads the address lock value and sets the lock flag (step 214).

The loading of values into the Lock elements occurs very quickly because the address lock and lock flag storage elements are implemented on the CPU chip. Accesses to these elements are therefore performed at the CPU speed rather than the much slower speed of the system bus.

While the CPU is manipulating the information (step 216), it is possible for another CPU to also execute a Load-Locked instruction for the same address. When the first CPU is ready to write the manipulated data back into main memory, it is therefore required to execute a Store-Conditional instruction which checks the status of the local lock flag before writing the data.

Figure 3:
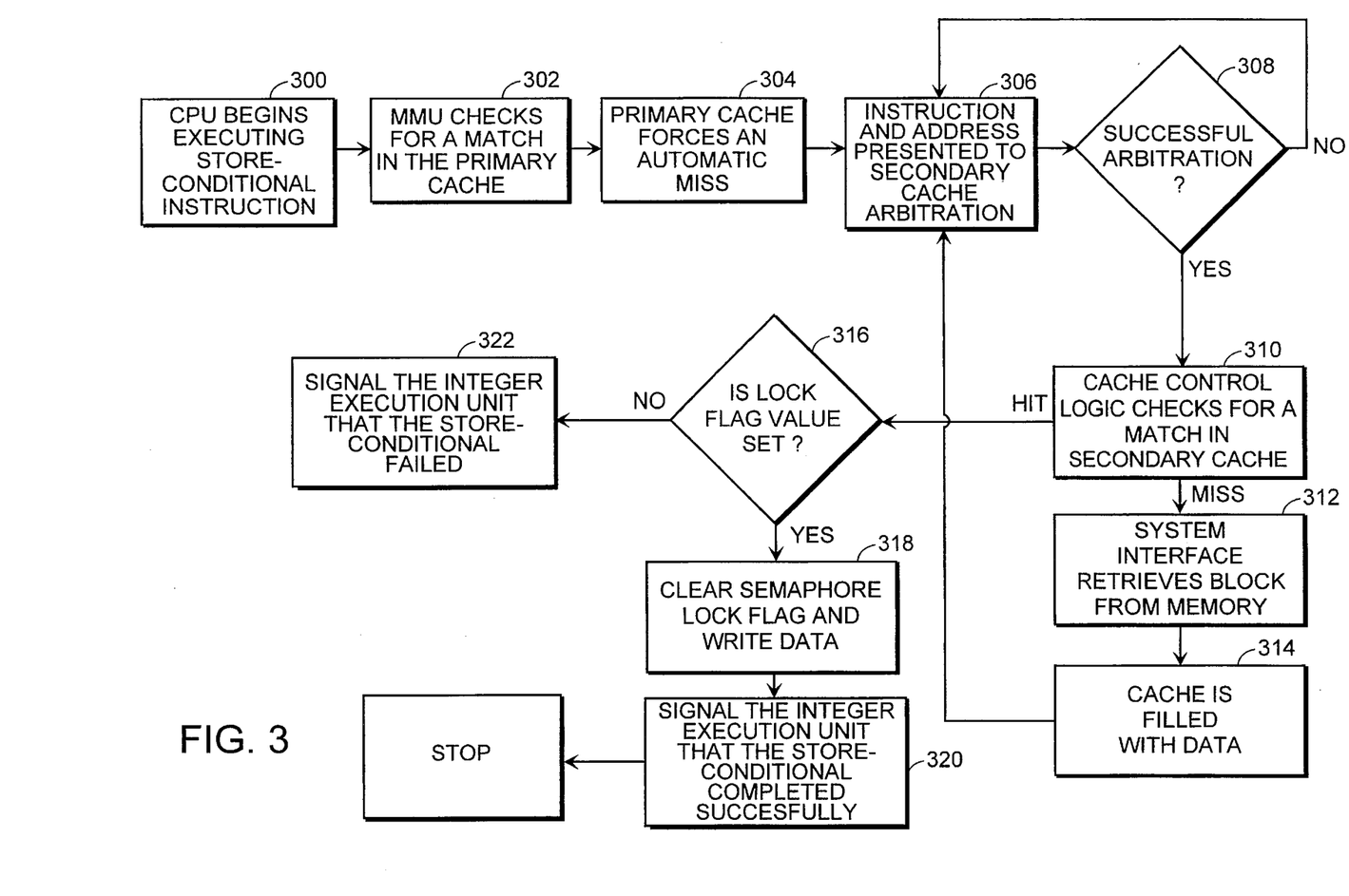
FIG. 3 is a flow chart diagram depicting the steps which the multiprocessor system of FIG. 1 performs when executing a Store-Conditional instruction.

Referring now to FIG. 3, a flow chart diagram is shown depicting the operation of the multiprocessor system of FIG. 1 in response to a Store-Conditional instruction. The operation starts when the central processing unit begins executing a Store-Conditional instruction (step 300) and its MMU checks for a match in the primary cache (step 302). When the control logic for the primary cache system detects the presentation of a Store-Conditional instruction, a miss is automatically forced (step 304). This passes control to the Cbox which presents the command and address to the secondary cache's arbitration unit (step 306). After successful arbitration (step 308) the cache control logic checks for a match in the secondary cache (step 310).

If a miss occurs the secondary cache sends an instruction to the interface logic to retrieve the block from memory (step 312) containing the requested address. When the cache is filled (step 314) the command and address are again presented (step 310) and a hit occurs.

When a hit occurs and the lock flag is still set (step 316) the transaction completes by clearing the lock flag and writing the data into the secondary cache (step 318). The benefit of having the lock flag on the CPU chip enables clearing the flag very quickly, at the CPU's operating speed. The Integer Execution Unit within the CPU which is executing the read-modify-write transaction is then signaled that the Store-Conditional completed successfully (step 320).

If the lock flag was already cleared when the Store-Conditional command checks the value of the lock flag, the Integer Execution Unit is signaled that the operation has failed (step 322). When the program detects this condition, it is required to execute another Load-Locked instruction and start the sequence of operations again. This sequence continues until the Store-Conditional instruction encounters a set lock flag and the write is able to complete.

Figure 4:
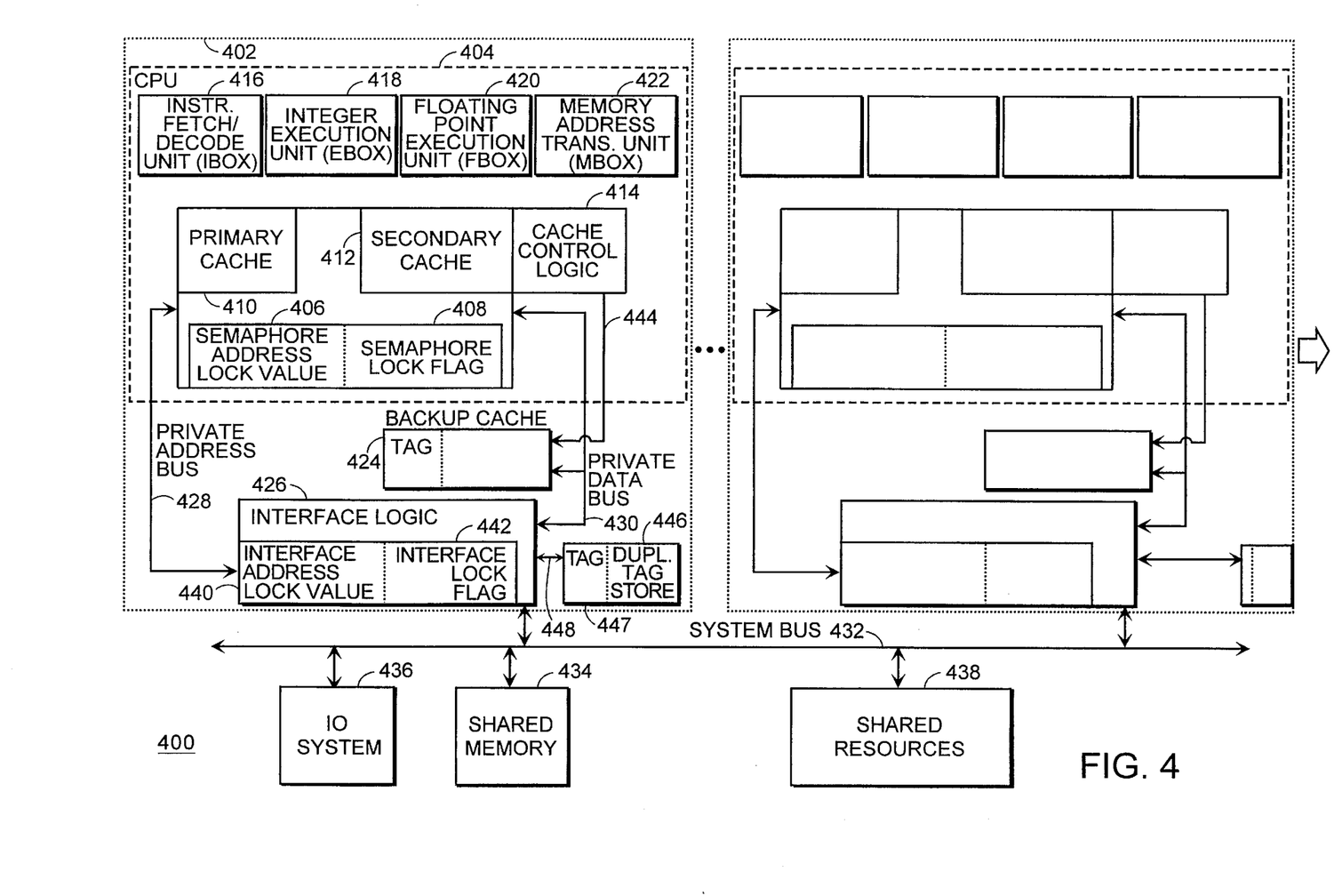
FIG. 4 is a block diagram depicting a multiprocessor system having a duplicate tag store architecture and a plurality of storage elements for implementing a semaphore.

Referring now to FIG. 4, a multiprocessor system 400 containing a duplicate tag store architecture is shown to include a plurality of processor modules 402 with each including a CPU 404 having a storage element for storing a semaphore address lock value 406 and a semaphore lock flag 408. Each CPU further including a primary cache 410, a secondary cache 412, cache control logic 414, an instruction fetch and decode unit 416, an integer execution unit 418, a floating point execution unit 420, and a memory address translation unit 422.

Each processor module has a backup cache 424 and a system bus interface logic 426. The system bus interface logic 426 connects the CPU's private address bus 428 and private data bus 430 to the system bus 432 for accessing main memory 434, an IO system 436, and other shared resources 438. The system bus interface 426 of each processor module 402 includes a second address lock value 440, hereafter referred to as an interface address lock value, and a second lock flag 442, hereafter referred to as an interface lock flag.

The private data bus 430 connects each processor module's backup cache 424 to its associated CPU 404. Each CPU further includes cache control logic 414 which is connected to the associated backup cache 414 by a private cache bus 444.

The architecture also includes a storage element within each processor module referred to as a duplicate tag store 446, which is connected by a private duplicate tag store bus 448 to its associated interface logic 426.

A complete copy of cache tags from each processor module's backup cache system 424 is kept in each duplicate tag store 446. The duplicate cache tags 447 include the valid, shared, and dirty status bits and the addresses from each CPU's 404 backup cache. When a central processing unit 404 initiates a memory access, the duplicate tag stores 446 of the other CPUs in the system compare the requested address against their list of tags. If the access is a write and the location is stored in the duplicate tag store 446, the system bus interface 426 sends an invalidate command to its associated CPU 404 indicating that the data has been modified.

Figure 5:
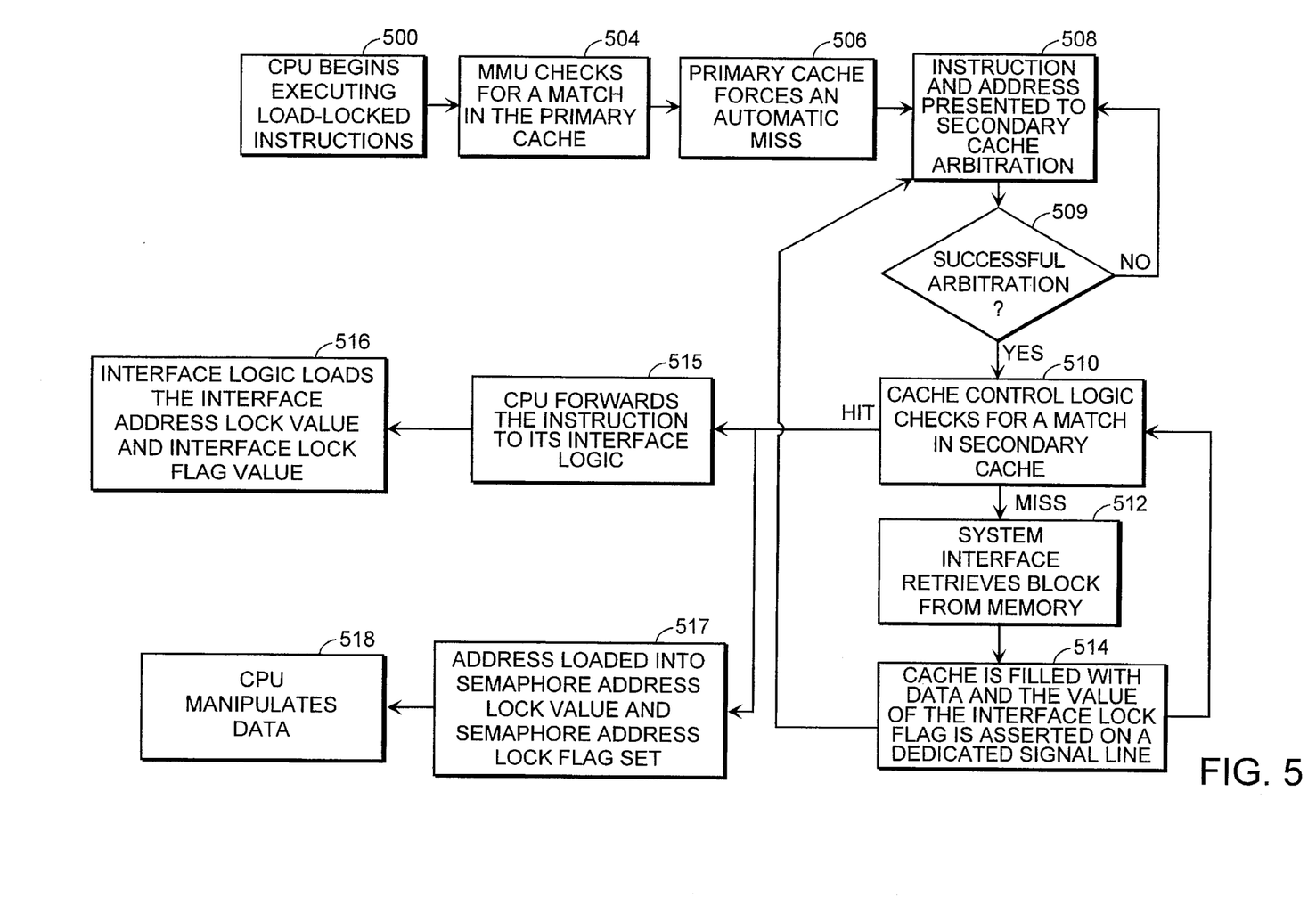
FIG. 5 is a flow chart diagram depicting the steps that the multiprocessor system of FIG. 4 performs when executing a Load-Locked instruction.

Referring now to FIG. 5, a flow chart diagram is shown depicting the operation of the multiprocessor system of FIG. 4 in response to a Load-Locked instruction. In the duplicate tag store architecture a semaphore is initiated when the CPU begins executing a Load-Locked instruction (step 500).

The CPU's MMU checks for a match in the primary cache (step 504) which forces an automatic miss (step 506) and passes control to the Cbox. The Cbox presents the command and address to the secondary cache's arbitration Unit (step 508). After successful arbitration (step 509), the secondary cache is checked for a match (step 510). If the secondary cache does not contain the requested address value, a miss occurs and the Cbox sends a command to the interface logic to retrieve the block from memory (step 512).

Whenever a write operation executes for an address kept in the duplicate tag store, the interface logic sends a command to its CPU to invalidate the cache entry. If there is no hit in the duplicate tag store, the interface logic sends no invalidate command to the CPU. When an operation occurs which causes the location whose address is stored in the semaphore address lock register to be evicted from the CPU's backup cache, the corresponding tag will also be evicted from the duplicate tag store. Without a Tag, there cannot be a hit in the duplicate tag store and the interface logic will not send an update to its CPU when another device attempts to access the locked location. This could cause the CPU to miss accesses to the lock address. Therefore, when the interface fills the cache with the data block it also asserts the current value of the interface lock flag on a dedicated signal line (step 514). The CPU logically "ands" this value with the current value of the semaphore lock flag and writes the product back into the semaphore lock flag. This operation is a logical "and" because it is possible for the semaphore values stored in the CPU to be loaded before the interface logic completes the loading of the interface semaphore address and lock values. Before the interface values are loaded, any write to the semaphore location detected on the system bus will cause the semaphore lock flag implemented in the CPU to be cleared while the interface lock flag remains set. In this manner, being able to load the semaphore address lock and lock flag values in the CPU without waiting for the interface values to be loaded increases the performance of the system by decreasing the overhead of the operation.

After the cache is filled (step 514) the Cbox re-issues the Load-Lock instruction and execution begins again (step 508). When the command and address are presented to the secondary cache (step 510), a hit occurs. The CPU forwards the instruction to its interface logic (step 515) so it can load the interface address lock value and interface lock flag (step 516). Simultaneously the Cbox also loads the address lock value and sets the lock flag (step 517), allowing the CPU to begin modifying the data (step 518).

Figure 6:
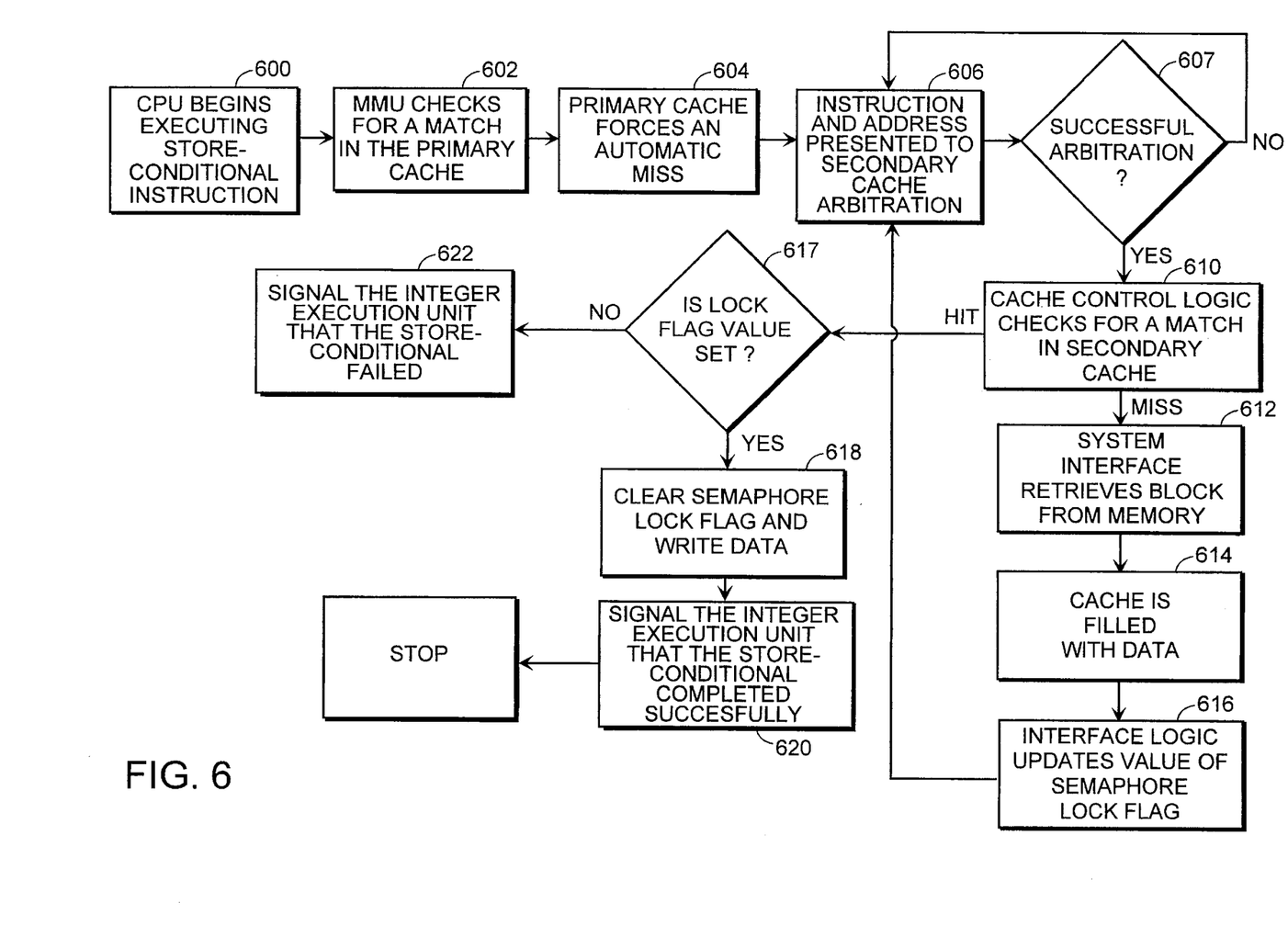
FIG. 6 is a flow chart diagram depicting the steps that the multiprocessor system of FIG. 4 performs when executing a Store-Conditional instruction.

Referring now to FIG. 6, execution of the Store-Conditional instruction is depicted for the multiprocessor system with a duplicate tag store architecture depicted in FIG. 4. The CPU begins executing the Store-Conditional instruction (step 600), and its MMU checks for a match in the primary cache (step 602). Next the primary cache forces an automatic miss (step 604) which passes control to the secondary cache (step 606). Upon winning arbitration (step 607), the secondary cache's control logic checks for a match (step 610). If the address has been evicted from the secondary cache, it has also been evicted from the duplicate tag store. In such a case, the CPU's local semaphore address value and semaphore lock flag may not be correct. The CPU will send a Read-Miss-Modify command to the interface logic causing it to retrieve the block from memory (step 612) and to fill the cache (step 614). When the interface fills the cache with the data block it also asserts the current value of the interface lock flag on a dedicated signal line. The CPU logically "ands" this value with the current value of the semaphore lock flag and writes the product back into the semaphore lock flag (step 616). The Store-Conditional instruction is then allowed to complete normally.

If the block containing the value of the address is not evicted from cache, then the duplicate tag store still contains the Tag for this location. When the command and address are presented to the secondary cache (step 610), a match will occur. If the semaphore lock flag has remained set (step 617), the CPU will clear it and write the data (step 618). The integer execution unit within the CPU is then signaled that the Store-Conditional has completed successfully (step 620).

If another CPU writes a location for which there is a lock flag set, there will be a Hit in the duplicate tag store which will cause the interface logic to clear its lock flag. The interface logic will then send the CPU a command to clear its lock flag. A subsequent Store-Conditional instruction will be prevented from writing the data, since it has been modified, and the integer execution unit will be signaled that the operation has failed (step 622). Software will then restart the sequence of semaphore operations.

Since the need to wait for the system interface to finish loading the address lock register and lock flag is avoided, and because the central processing units have direct access to the semaphore address lock and lock flags values, loads of the semaphore constructs occur at the clock speed of the CPU rather than the slower speed of the system bus. The overhead time incurred during semaphore operations is therefore decreased which significantly improves system performance.

Having described the preferred embodiments for the invention, it will now become apparent to one of ordinary skill in the art, that other embodiments incorporating its concept may be used. Thus, it is felt that the invention should not be limited to the disclosed embodiments, but rather should be limited only by the sphere and scope of the appended claims.

What is claimed is:

1. A central processing unit coupled to a system bus interface wherein said central processing unit comprises:
   a storage element disposed in the central processing unit, said storage element dedicated for storing a semaphore address lock value and a semaphore lock flag value, said semaphore address lock value indicating an address of a location to be modified in an attached memory system by said central processing unit, and said semaphore lock flag value indicating the accessibility of said address by said central processing unit.

2. The central processing unit of claim 1 wherein said storage element is accessible only by said central processing unit.

3. A computer system comprising:
   a processor module including:
      a central processing unit comprising: a storage element disposed in the central processing unit dedicated for storing a semaphore address lock value and a semaphore lock flag value;
      a system bus interface for communicating over a system bus in said computer system;
      a cache memory system for storing data and instruction values used by said central processing unit;
   a memory system for storing data and instructions for said processor module;
   an IO system for allowing said processor module to communicate with data input devices and data output devices;
   a system bus, connecting said processor module, said memory system, and said IO system.

4. The computer system of claim 3 wherein said storage element is accessible only by said central processing unit.

5. The computer system of claim 4 wherein said system bus interface comprises:
   a second storage element dedicated for storing a second semaphore address lock value and a second semaphore lock flag value;
   means for monitoring accesses to said memory system for updating the value of said storage element implemented in said central processing unit and the value of said second storage element implemented in said system bus interface.

6. The computer system of claim 5 wherein said storage element disposed in said central processing unit dedicated for storing said semaphore lock flag value, is updated with the value stored in said second storage element disposed in said system bus interface dedicated for storing said second semaphore lock flag value, when said system bus interface fills said cache system with data from said memory system.

7. A multiprocessor computer system comprising:

a plurality of processor modules each comprising:

a central processing unit comprising: a storage element disposed in the central processing unit dedicated for storing a semaphore address lock value and a semaphore lock flag value;

a cache memory system for storing data and instruction values used by said central processing unit;

a system bus interface for communicating with other said plurality of processor modules over a system bus in said multiprocessor computer system;

a memory system implemented as a common system resource available to said plurality of processor modules for storing data and instructions for said plurality of processor modules;

an IO system implemented as a common system resource available to said plurality of processor modules for each of said plurality of processor modules to communicate with data input devices and data output devices;

a system bus connecting said plurality of processor modules to said memory system and to said IO system.

8. The multiprocessor computer system of claim 7 wherein said storage elements are accessible only to the central processing unit in which said storage element is implemented.

9. The multiprocessor computer system of claim 8 wherein each one of said system bus interfaces comprises:

a second storage element dedicated for storing a second semaphore address lock value and a second semaphore lock flag value, said storage element accessible only to said system bus interface in which said storage element is implemented;

means for monitoring accesses to said memory system for updating the value of each of said storage elements disposed in said plurality of central processing units and for updating the value of said second storage elements disposed in said system bus interface.

10. The multiprocessor computer system of claim 9 wherein each of said system bus interfaces further comprises:

means for communicating with each of the other system bus interfaces of each of said plurality of processor modules using said system bus.

11. The multiprocessor computer system of claim 10 wherein said storage element disposed in said central processing unit dedicated for storing said semaphore lock flag value, is updated with the value stored in said second storage element disposed in said system bus interface dedicated for storing said second semaphore lock flag value, when said system bus interface fills said cache system with data from said memory system.

12. A method for increasing the performance of a computer system comprising the steps of:

storing a semaphore address lock value and a semaphore lock flag value in a storage element in the central processing unit of said computer system;

reading the data from the address stored in the storage element containing the semaphore address lock value;

modifying said data;

reading said storage element containing said semaphore lock flag value;

writing said data to the address stored in said storage element containing said semaphore address lock value only if said semaphore lock flag value has not been changed;

clearing said semaphore lock flag value stored in said storage element after data is written.

* * * * *